(12) United States Patent
Tantius

(10) Patent No.: US 6,923,462 B2
(45) Date of Patent: Aug. 2, 2005

(54) FASTENING ELEMENT FOR A SHOCK ABSORBER

(75) Inventor: Andreas Tantius, Troisdorf (DE)

(73) Assignee: ZF Sachs AG, Schweinfurt (DE)

(*) Notice: Subject to any disclaimer, the term of this patent is extended or adjusted under 35 U.S.C. 154(b) by 122 days.

(21) Appl. No.: 10/349,982

(22) Filed: Jan. 23, 2003

(65) Prior Publication Data

US 2003/0137122 A1 Jul. 24, 2003

(30) Foreign Application Priority Data

Jan. 23, 2002 (DE) .......................... 102 02 350

(51) Int. Cl.⁷ .......................... B60G 15/06; F16F 9/54
(52) U.S. Cl. .............................. 280/124.155; 267/220; 267/221; 188/321.11
(58) Field of Search .................. 280/124.155, 124.147, 280/124.154, 124.145, 124.146; 267/220, 221, 177; 188/321.11

(56) References Cited

U.S. PATENT DOCUMENTS

| | | | | |
|---|---|---|---|---|
| 3,603,575 A | * | 9/1971 | Arlasky et al. | 267/34 |
| 4,342,372 A | * | 8/1982 | Hayes | 180/182 |
| 4,438,908 A | * | 3/1984 | Terada | 267/221 |
| 4,744,444 A | * | 5/1988 | Gillingham | 267/221 |
| 5,878,851 A | * | 3/1999 | Carlson et al. | 188/322.15 |
| 6,357,564 B1 | | 3/2002 | Tantius | 188/321.11 |

FOREIGN PATENT DOCUMENTS

| | | | | |
|---|---|---|---|---|
| DE | 1 200 145 | | 9/1965 | |
| DE | 3230936 A | * | 2/1984 | B60G/15/06 |

* cited by examiner

Primary Examiner—Peter C. English
(74) Attorney, Agent, or Firm—Cohen, Pontani, Lieberman & Pavane

(57) ABSTRACT

Fastening element for a shock absorber includes a first part which is fixed to the piston rod of the a shock absorber and is provided with an aperture for a bearing bolt and a second part with a bearing surface for a helical spring surrounding the shock absorber. The second part coaxially surrounds the first part and is held relative to the first part at least in an axial direction by a securing ring.

7 Claims, 5 Drawing Sheets

FASTENING ELEMENT FOR A SHOCK ABSORBER

BACKGROUND OF THE INVENTION

1. Field of the Invention

The invention relates to a fastening element for a shock absorber, comprising an annular fastening element which is fixed to the piston rod of the shock absorber and is provided, on the one hand, with a passage orifice for a bearing bolt and, on the other hand, with a bearing surface for a helical spring surrounding the shock absorber.

2. Description of the Related Art

Shock absorbers with fastening elements for the helical spring are already known (DE 40 21 314 A1, DE-AS 1 200 145), in which the shock absorber is surrounded by a helical spring. This helical spring is fastened via spring plates, on the one hand, to the outer cylinder of the shock absorber and, on the other hand, to the piston rod of the shock absorber. The actual fastening elements which serve for fixing to the wheel suspension or to the vehicle body are not affected thereby.

Furthermore, fastening elements with a line connection (U.S. Pat. No. 6,357,564) are known, in which an annular bearing body is provided with an aperture for a bearing bolt for fastening to the vehicle, the annular bearing body in this case being designed with a receiving channel for an electrical line. This electrical line, on the one hand, is not to have any disadvantageous bend when being led out of the piston rod, but, on the other hand, is also to ensure a mounting of the helical spring and the support associated with this on a bearing surface on the fastening element. The problems with shock absorbers of this type are to be seen in that the vehicle manufacturer has to mount the helical spring after the delivery of the respective shock absorber. This is all the more difficult, the more complicated the design of the shock absorber is, that is to say when additional electrical lines for adjustable shock absorbers or else externally arranged compensating spaces are provided.

SUMMARY OF THE INVENTION

The object of the present invention is to provide a fastening element for shock absorber, said fastening element being capable of being premounted by the manufacturer of the shock absorber to an extent such that the helical spring can easily be retrofitted by the vehicle manufacturer.

To achieve this object, there is provision for the fastening element to have a two-part design, the first part connected to the piston rod coaxially surrounding the passage orifice and the second part coaxially surrounding the first part and having the bearing surface, and for the first and the second part to be held relative to one another at least in an axial direction via a securing ring.

In this case, it is advantageous that, by virtue of the two-part form of construction, the fastening element can be prepared in such a way that the first part of the fastening element is already connected to the piston rod of the shock absorber, while, if appropriate, connecting cables projecting out of the cavity of the piston rod can likewise be mounted. The second part of the fastening element can in this case likewise be mounted and be prepared for the dispatch of the parts via a securing ring, so that subsequently, at the vehicle manufacturer, only the securing ring and the second part have to be removed for the mounting of the helical spring and, after the subsequent remounting of the second part and subsequent securing by the securing ring, the already mounted shock absorber, together with the helical spring, can be installed in the vehicle.

According to an essential feature, there is provision for the second part to be braced relative to the securing ring by means of the prestress of the helical spring.

An advantageous embodiment provides for the securing ring to have an open region, the clear opening of which is larger than the distance between opposed flat surfaces provided on the groove bottom of a groove receiving the securing ring in the first part of the fastening element.

There can advantageously be provision for the first part of the fastening element to have a receiving channel for a line led out of the piston rod of the shock absorber.

Furthermore, there is provision for the first and the second part of the fastening element together to form, on the side facing the shock absorber, a recess which is open in the axial direction and which serves for receiving an elastomeric element.

A further embodiment provides for the clear outside diameter of the first part to be smaller than the inside diameter of the helical spring. In this case, advantageously, the securing ring can be secured against rotation.

Moreover, there is provision for the clear outside diameter of the first part to be smaller than the inside diameter of the spring plate and of the lock nut. This ensures that, in the event of an exchange, these components can be replaced, without the first structural part being demounted.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
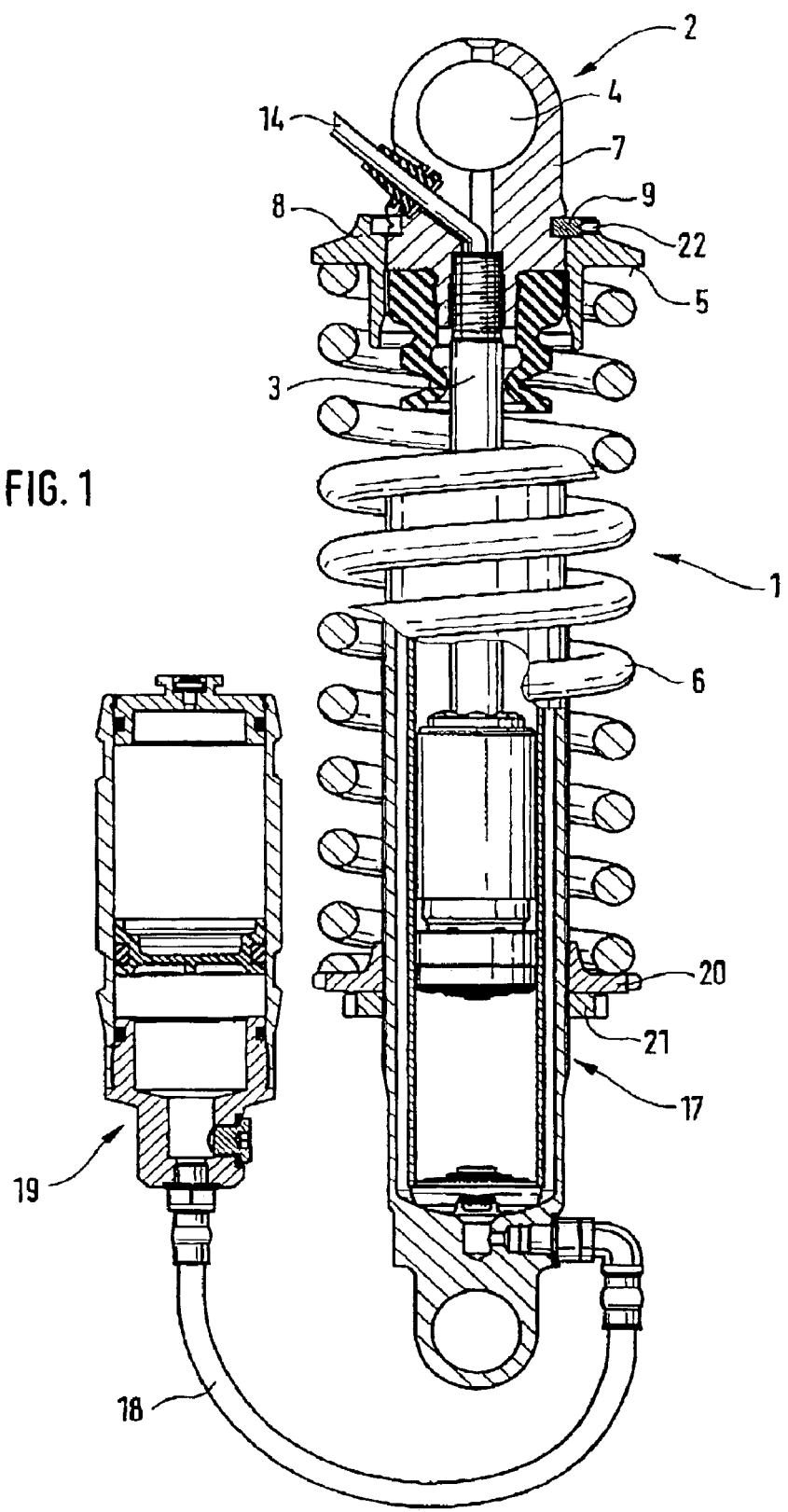
FIG. 1 is a longitudinal section of a shock absorber with a fastening element and with a compensating space arranged externally via a hose connection.

The shock absorber 1 illustrated in FIG. 1 consists essentially of the container 17, of the compensating space 19 connected via a pipe connection 18, of the piston rod 3, of the helical spring 6 and of the annular fastening element 2. The helical spring 6 is supported on the container 17 of the shock absorber 1 via a spring plate 20, and, if appropriate, this spring plate 20 can be axially adjustable and, if appropriate, can be fixed via a lock nut 21. At its upper end, the shock absorber 1 is provided with an annular fastening element 2, the first part 7 being connected to the piston rod 3 via a thread, while the second part 8 has a bearing surface 5 for supporting the helical spring 6, the first part 7 and the second part 8 being fixed relative to one another with the aid of the securing ring 9. A screw 22 is also additionally provided against the rotation of the securing ring. By means of the prestress of the helical spring 6, the second part 8 is pressed against the securing ring 9 and is held in the predetermined position.

The shock absorber 1 is provided in its interior with an adjustable damping valve, the electrical line 14 being led outward through the fastening element 2. The principle of such a line connection may be gathered from U.S. Pat. No. 6,357,564, which is hereby incorporated by reference. The aperture 4 is used for fastening to the vehicle.

Figure 2:
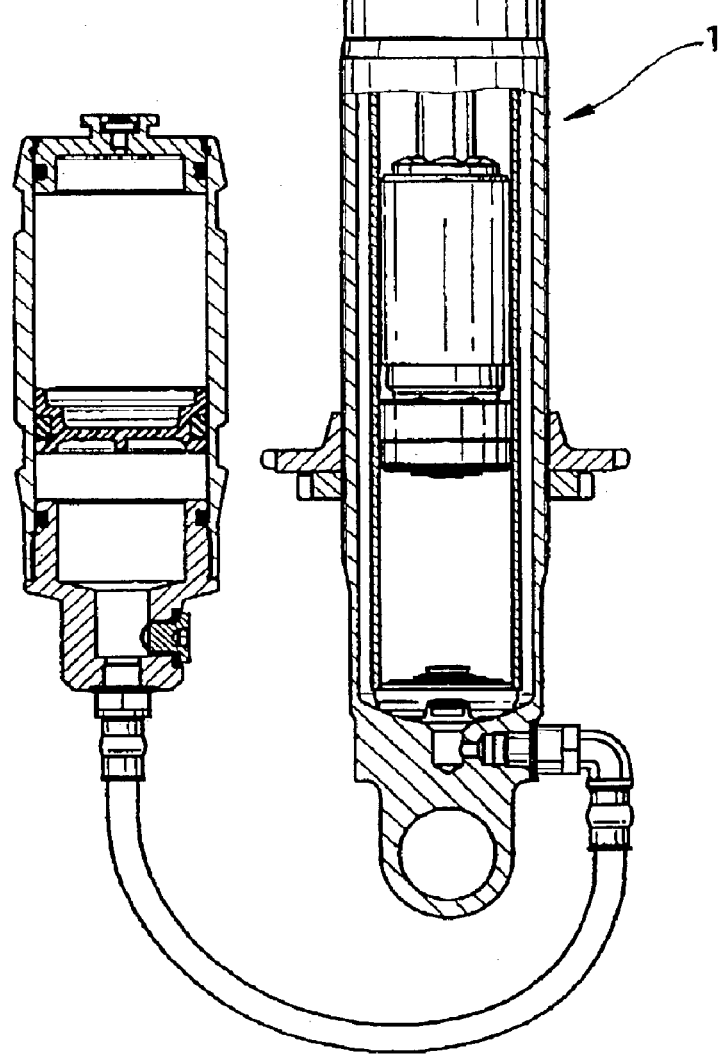
FIG. 2 is a longitudinal section of a partially assembled shock absorber.
Figure 2A:
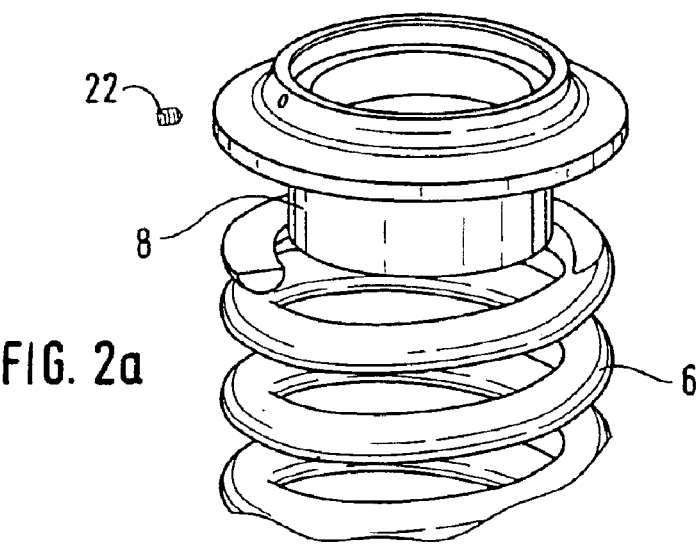
FIG. 2a is a perspective of the fastening element.
Figure 2B:
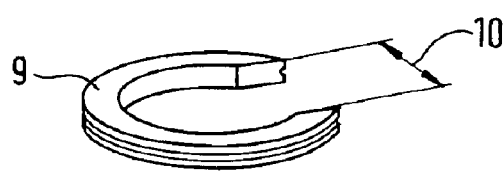
FIG. 2b is a perspective of the associated securing ring.

FIG. 2 shows a partially assembled fastening element 2 mounted on the piston rod 3 of the shock absorber 1. The clear outside diameter of the first part 7 is smaller than the inside diameter of the helical spring 6, so that, in the state illustrated in FIG. 2, the helical spring can easily be slipped over the shock absorber 1, while the electrical line 14 can be removed from the receiving channel 13 and placed vertically. The corresponding recess in the fastening element 2 affords the easy mounting of the helical spring, so that subsequently, according to FIG. 2a, the second part 8 can likewise be slipped over the first part 7 of the fastening element 2 and, in the next step, the securing ring 9 can be introduced into the groove 12. For this purpose, the groove bottom 11 is provided with opposed flat surfaces 25 (FIG. 3b), the clear opening 10 of the securing ring 9 being larger than the distance between surfaces 25 of the groove bottom 11 in the groove 12. The securing ring is then introduced at right angles to the longitudinal axis of the shock absorber 1 and the second part 8 is fixed relative to the first part 7 by rotation. The electrical line 14 can subsequently be introduced into the receiving channel 13 again and be secured against bending by means of an elastomeric bush 23.

Figure 3A:
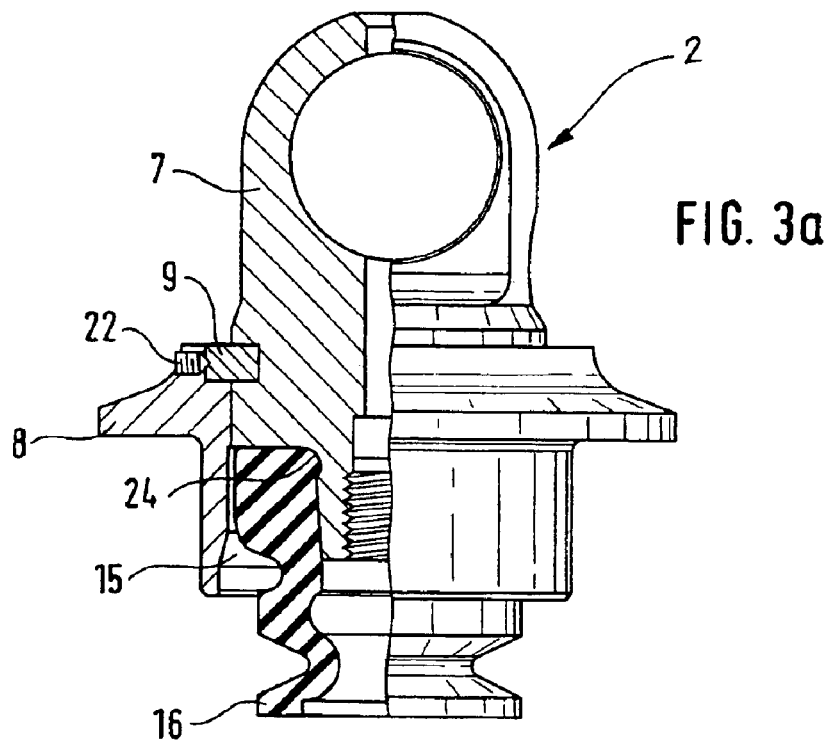
FIG. 3a is a partial longitudinal section of a fastening element.
Figure 3B:
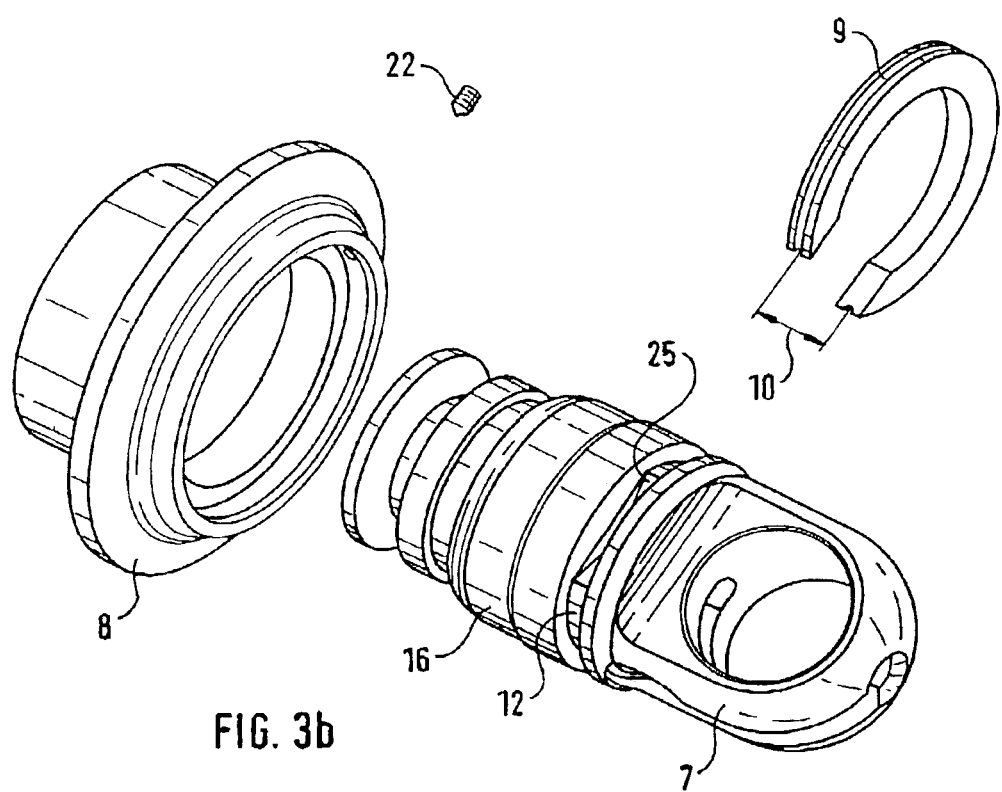
FIG. 3b is an exploded perspective of the fastening element.

FIGS. 3a and 3b illustrate as a detail an annular fastening element 2, the first part 7 being fixed relative to the second part 8 by means of the securing ring 9. A recess 15, into which an elastomeric element 16 can be introduced, is formed in the axial direction between these parts, the elastomeric element 16 being capable of being designed as a pressure stop and being capable of being snapped in this recess by means of a corresponding undercut 24. FIG. 3b shows the first part 7, the second part 8 and the securing ring 9 in a perspective view, the elastomeric element 16 already having been mounted before the mounting of the second element 8 relative to the first part 7, and the securing ring 9 being provided with the clear opening 10 which has a larger spacing than the two associated key surfaces 25 of the first part 7. After the securing ring 9 has been introduced into the groove 12, fixing can be achieved by the securing ring 9 being rotated.

Figure 4:
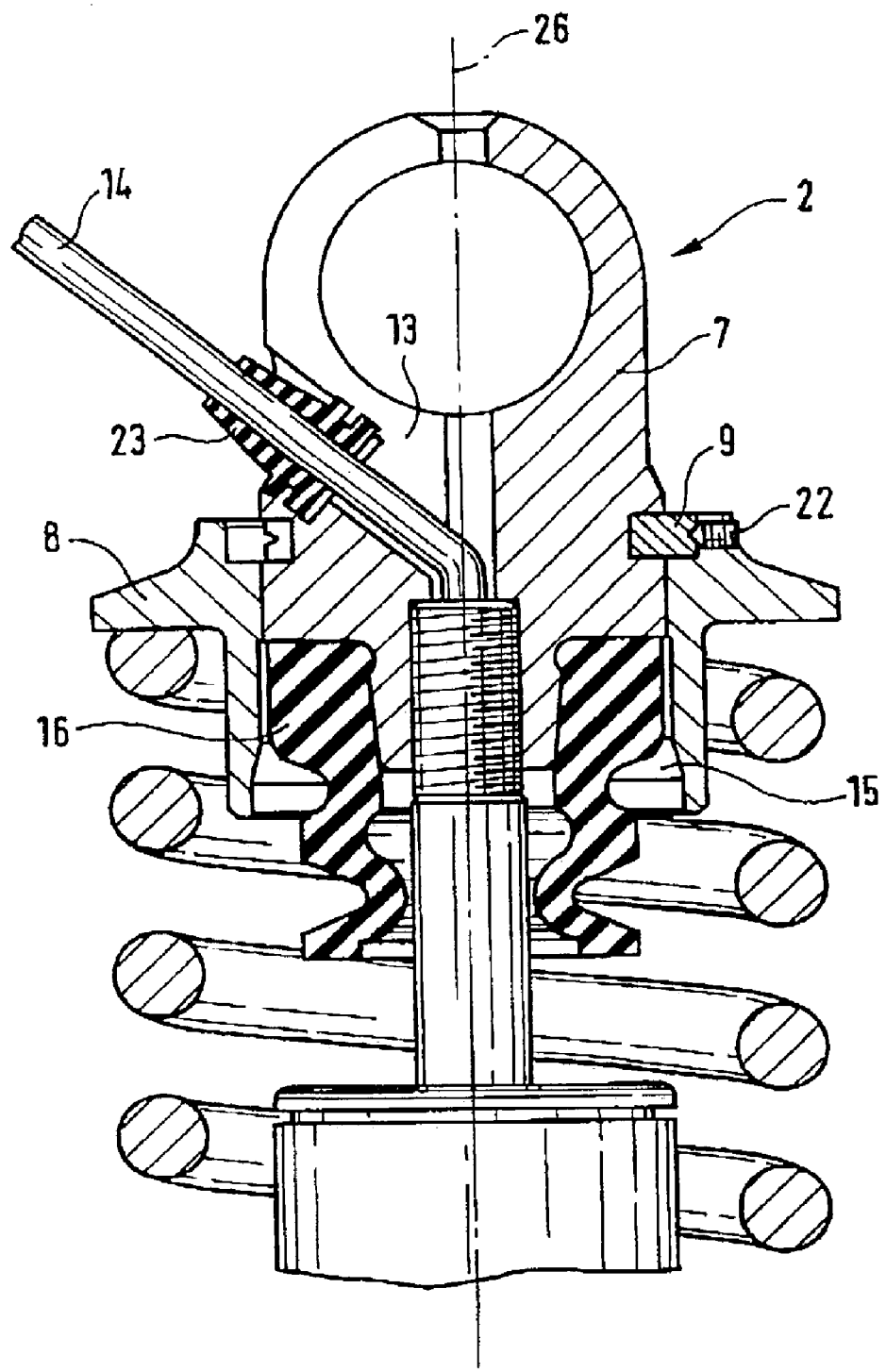
FIG. 4 is a partial longitudinal section of a fastening element in a completed version, together with an associated electrical connecting line.

FIG. 4 shows an annular fastening element 2 in an enlarged view, the electrical line 14 being introduced, protected by the bush 23, into the channel 13 of the first part 7.

The first part 7 is fixed relative to the second part 8 via the securing ring 9 and the screw 22, the recess 15 being provided with the elastomeric element 16. The receiving channel 13 for the electrical line 14 in this case reaches into the center axis 26 of the shock absorber 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A fastening element for securing a shock absorber to a vehicle, said fastening element comprising:

a first part having means for engaging a piston rod of the shock absorber, and an aperture for a bearing bolt for fastening to a vehicle;

a second part coaxially surrounding the first part and having a bearing surface for a helical spring surrounding the shock absorber; and a securing ring for holding said first part axially relative to said second part, wherein said securing ring has a circumferential opening with a width and said first part has a groove which receives said securing ring, said groove having a groove bottom with opposed surfaces separated by a distance which is smaller than the width of the circumferential opening.

2. A fastening element as in claim 1 wherein said first part has a receiving channel for an electrical line passing out of said piston rod.

3. A fastening element as in claim 1 wherein said first part and said second part form an axially open recess, said fastening element further comprising an elastomeric element received in said recess around said piston rod.

4. A fastening element as in claim 1 wherein said first part has a clear outside diameter which is smaller than an inside diameter of said helical spring.

5. A fastening element as in claim 1 wherein said securing ring is secured against rotation relative to said first part and said second part.

6. A fastening element as in claim 1 further comprising a spring plate for supporting said helical spring oppositely from said second part, and a lock nut for axially positioning said spring plate relative to said shock absorber, said first part having a clear outside diameter which is smaller than an inside diameter of the spring plate and the lock nut.

7. A fastening element as in claim 1 where said opposed surfaces on said groove bottom are flat surfaces.

* * * * *